(12) United States Patent
Warpinski et al.

(10) Patent No.: US 9,898,003 B2
(45) Date of Patent: Feb. 20, 2018

(54) EXTERNAL AIRCRAFT GROUND CONTROL (71) Applicant: HONEYWELL INTERNATIONAL INC., Morristown, NJ (US)

(72) Inventors: Matthew Warpinski, Albuquerque, NM (US); Andrew Fannon Lamkin, Albuquerque, NM (US); Duke Buster, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 340 days.

(21) Appl. No.: 14/711,952

(22) Filed: May 14, 2015

(65) Prior Publication Data
US 2016/0334786 A1    Nov. 17, 2016

(51) Int. Cl.
G05D 1/00       (2006.01)
B64C 25/40      (2006.01)
B64C 19/00      (2006.01)
B64F 1/00       (2006.01)
B64F 1/22       (2006.01)
G08G 5/00       (2006.01)
G08G 5/06       (2006.01)

(52) U.S. Cl.
CPC .......... *G05D 1/0022* (2013.01); *B64C 19/00* (2013.01); *B64C 25/405* (2013.01); *B64F 1/002* (2013.01); *B64F 1/22* (2013.01); *G05D 1/0016* (2013.01); *G05D 1/0083* (2013.01); *G08G 5/0013* (2013.01); *G08G 5/0026* (2013.01); *G08G 5/0043* (2013.01); *G08G 5/065* (2013.01); *Y02T 50/823* (2013.01)

(58) Field of Classification Search
CPC .................................................. B64B 25/405
See application file for complete search history.

(56) References Cited

U.S. PATENT DOCUMENTS 7,099,752 B1 *   8/2006  Lenell .................. G05D 1/0027
                                            244/189
8,924,040 B2    12/2014  Edelson et al.
2003/0083794 A1 *  5/2003  Halm ..................... B64D 47/00
                                            701/29.4
2013/0332025 A1 * 12/2013  Ziarno ............... G05B 23/0213
                                            701/33.4

(Continued)

FOREIGN PATENT DOCUMENTS

EP    2660676 A1    11/2013
GB    2509803 A     7/2014

(Continued)

OTHER PUBLICATIONS

Extended EP Search Report for Application No. 16167984.0-1802 dated May 10, 2016.

(Continued)

*Primary Examiner* — Thomas G Black
*Assistant Examiner* — Ana D Thomas
(74) *Attorney, Agent, or Firm* — Lorenz & Kopf, LLP (57) ABSTRACT Embodiments of the subject matter described herein provide an innovative method and system capable of enabling external ground control of a manned aircraft without a pilot or crew, in order to (i) move the aircraft, and (ii) command various subsystems of the aircraft. The provided method and system supports secure wireless communication between the aircraft and a remote device.

19 Claims, 4 Drawing Sheets (56) References Cited

U.S. PATENT DOCUMENTS

| 2014/0067169 A1* | 3/2014 | Hughes | G05D 1/0083 |
| | | | 701/3 |
| 2014/0105412 A1* | 4/2014 | Alves | G10K 11/1784 |
| | | | 381/71.6 |
| 2015/0203193 A1* | 7/2015 | Cox | B64C 25/405 |
| | | | 701/2 |

FOREIGN PATENT DOCUMENTS

| WO | 2012061532 A1 | 5/2012 |
| WO | 2012109380 A2 | 8/2012 |
| WO | 2014153182 A2 | 9/2014 |
| WO | 2014184608 A2 | 11/2014 |

OTHER PUBLICATIONS

Northrop Grumman Corporation; Photo Release—Northrop Grumman, U.S. Navy Demonstrate Precision, Wireless Ground Handling of X-47B Unmanned Aircraft; Maneuvers With Handheld Controller Build Confidence for Future Trials on Carrier Deck, 2012.
Mototok; Maximum Manoeuvrability; Generate more efficiency and safety in your operations, 2014.

* cited by examiner

EXTERNAL AIRCRAFT GROUND CONTROL

TECHNICAL FIELD

Embodiments of the subject matter described herein relate generally to external aircraft ground control and, more particularly, to external aircraft ground control of an aircraft.

BACKGROUND

Ground crews need to be able to move grounded aircraft at any time of the day or night. In addition to moving a grounded aircraft, ground crews often need to perform other ground control operations on aircraft subsystems, such as running diagnostic tests, moving mechanical parts, performing inspections, and toggling lights. These ground control operations traditionally require at least one person in the aircraft cockpit, for braking, or for control of other aircraft subsystems. Eliminating the need for a person in the aircraft cockpit during aircraft movement and other ground control operations would reduce personnel count and cost.

Eliminating the need for a person in the aircraft cockpit during ground control means moving at least some of the aircraft command and control external to the aircraft, which increases the need for secure external communication. Wireless communication has experienced a growth surge of technological advancement that positions it to meet this need for secure external communication. In addition to the technological advances in wireless communications, electronic taxi systems (E-taxi systems) and relaxed Federal Aviation Administration (FAA) rules on the use of wireless communication around aircraft have opened up a variety of possibilities. Along with these technological advancements, there has been a corresponding increase in trust in wireless communications.

Consequently, an innovative method and system capable of enabling external ground control of a manned aircraft without a pilot, in order to (i) move the aircraft without the need for a pilot or crew, and (ii) command various subsystems of the aircraft is desirable. The desired method and system supports secure wireless communication between the aircraft and a remote device.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method for external ground control, using a remote device, of a manned aircraft without a pilot, the aircraft having a plurality of aircraft subsystems, is provided. The method comprises: enabling the remote device to access an aircraft subsystem; creating a secure communication connection between the remote device and the aircraft subsystem when the remote device is enabled; receiving aircraft engine sensor information; determining, from the aircraft engine sensor information, when the aircraft engine is off; and commanding the aircraft subsystem, from the remote device, only when the aircraft engine is off.

Also provided is a system for external ground control, using a remote device, of a manned aircraft without a pilot, the aircraft having a plurality of aircraft subsystems. The system comprises: an on-board transceiver configured to support a secure communication connection with the remote device; an on-board processor coupled to the transceiver and an aircraft subsystem and configured to i) enable the remote device to access the aircraft subsystem, ii) create the secure communication connection when access to the remote device is enabled, iii) perform a safety check of the aircraft, and v) allow the remote device to command the aircraft subsystem, only when the remote device is enabled and the safety check passes.

Another method for external ground control of an aircraft having a plurality of aircraft subsystems, using a remote device, is provided. The method comprises: enabling the remote device to have access to an aircraft subsystem; creating a secure communication connection between the remote device and the aircraft when the remote device is enabled; performing a safety check of the aircraft; receiving, by the remote device, control options associated with the aircraft subsystem; graphically displaying, on the remote device, the control options; receiving, by the remote device, a user selected control option; and commanding the aircraft subsystem in accordance with the user selected control option, only when the safety check passes.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to the transmittal of data, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing external control of a manned vehicle, without the need for a pilot or crew, in any industrial, commercial, military, aviation, or consumer application. As may be readily understood, a remote device may be enabled to access a variety of available vehicle subsystems to perform various external ground control operations above and beyond merely moving a vehicle. As such, the examples presented herein are intended as non-limiting.

Figure 1:
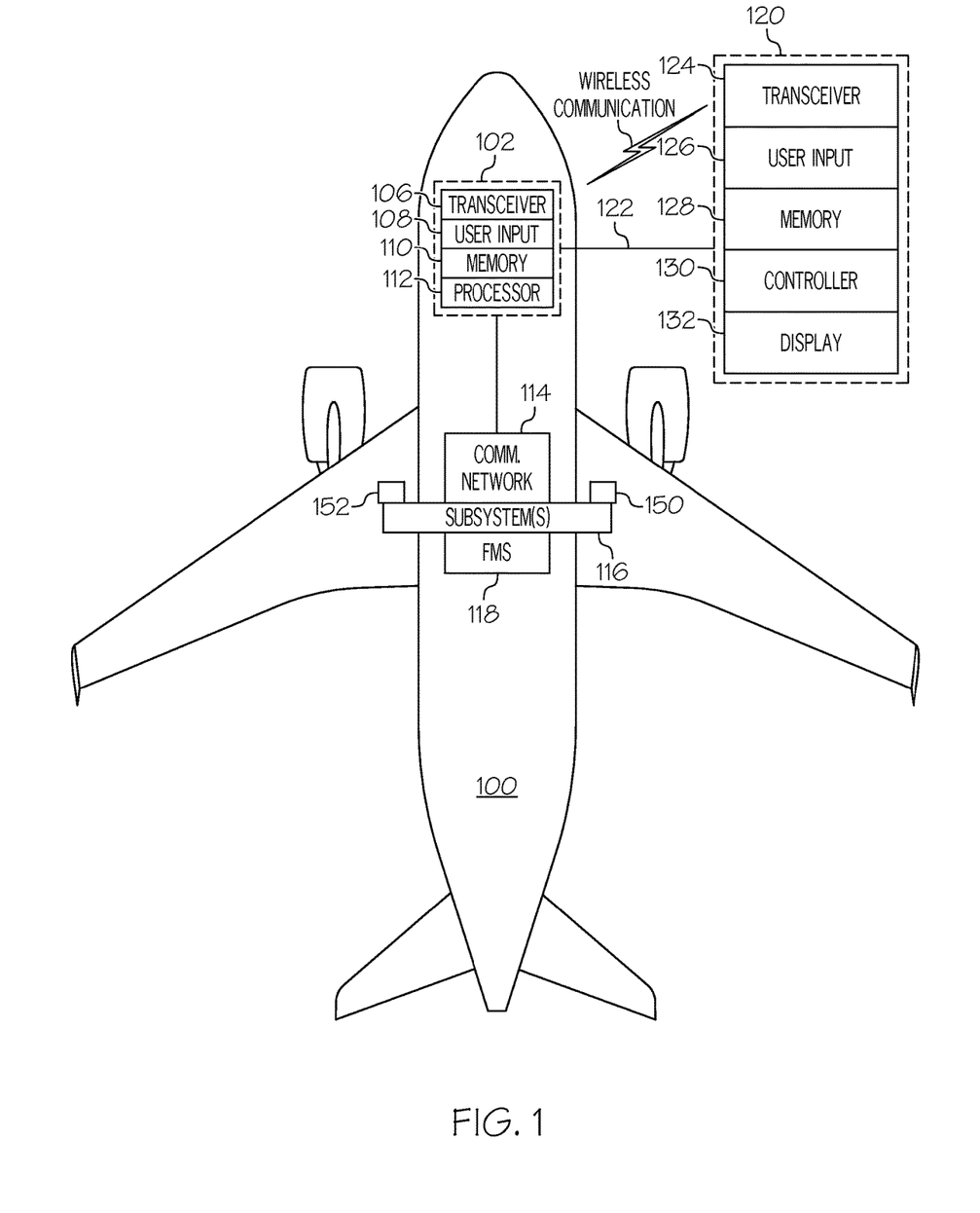
FIG. 1 is a simplified illustration of an aircraft in communication with a remote device, according to an exemplary embodiment.

FIG. 1 is a simplified illustration of an aircraft in communication with a remote device, according to an exemplary embodiment. Onboard external control module 102, located on the Aircraft 100, is coupled to the aircraft's communication network 114, aircraft subsystems 116, and flight management system (FMS) 118. Onboard external control module 102 may comprise a transceiver 106, user input module 108, memory 110, and on-board processor 112. Although shown as discrete components, the components of onboard external control module 102 may be integrated into already existing components of aircraft 100, such as an aircraft central processor, memory, FMS 118, transceiver, and the like.

The onboard external control module 102 performs a variety of functions. One function is to enable a remote device to have access to aircraft subsystems 116. The onboard external control module 102 is also configurable to support a secure communication connection with remote device 120, in reliance on a ground line 122 or any form of commercially available wireless communication technology.

The secure communication connection occurs between the transceiver 106 and a remote transceiver 124 in the remote device 120. When the secure communication connection is wireless communication, it may take the form of any commercially available and qualified wireless communication technology/protocol such as radio frequency identification (RFID) and WI-FI. As previously mentioned, transceiver 106 may be a discrete, installed component, or its function may be performed by an already existing aircraft transceiver.

User input module 108 may be realized as any one or more of a keypad, touchpad, keyboard, mouse, touchscreen, joystick, knob, microphone, speech recognition, gestures or another suitable device adapted to receive input from a user. Generally, user input module 108 allows a pilot, crew, or authorized personnel to adjust and customize aircraft features by entering information at the user input module 108. As such, user input module 108 may be an already existing aircraft 100 component. In an embodiment, the remote device 120 may be enabled by user input at input module 108, wherein "enabled" means that it is granted access to various aircraft subsystems, typically via the aircraft communication network 114.

User input device 126, located on remote device 120, may also be any one or more of a keypad, touchpad, keyboard, mouse, touchscreen, joystick, knob, microphone, speech recognition, gestures or another suitable device adapted to receive input from a user. When aircraft 100 does not have a pilot or crew, and the process 400 (depicted in FIG. 4 and described further below) for external control of an aircraft is started, user input intended to control and command one or more aircraft subsystems 116 is supplied via user input device 126.

In an embodiment, remote device 120 employs at least a touchscreen for user input device 126, and an enabled remote device 120 externally controls an aircraft subsystem 116 as follows. Controller 130, coupled to the user input device 126, processes a user selection and transmits it to the onboard external control module 102. On-board processor 112, in the onboard external control module 102, converts the user selection into a command and forwards the command, via the aircraft communication network 114, to a respective aircraft subsystem 116. In other embodiments, the conversion of the user selection into a command may occur in the remote device 120.

The on-board processor 112 and the controller 130 located within the remote device 120 may be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The on-board processor 112 and controller 130 may include or cooperate with an appropriate amount of memory (for example memory 110 and memory 128), which can be realized as RAM memory, flash memory, EPROM memory, EEPROM memory, registers, a hard disk, a removable disk, a CD-ROM, or any other form of storage medium known in the art. In this regard, the memory can be coupled to the processor such that the processor can read information from, and write information to, the memory. In the alternative, memory may be integral to the on-board processor 112 and controller 130. In practice, a functional or logical module/component of the system described here might be realized using program code that is maintained in the memory, or in separately located memory. Moreover, the memory can be used to store data utilized to support the operation of the system, as will become apparent from the following description. The on-board processor 112 may be realized as an onboard component of a vehicle (e.g., an onboard management system, central maintenance computer, a flight deck control system, a flight management system (FMS 118), or the like), or it may be realized in a portable computing device that is carried onboard the vehicle.

Remote device 120 typically communicates wirelessly, but also has an option to connect via a hard-wired ground line 122, if the wireless signal is weak or causes a security concern. Remote device 120 includes a controller 130, memory 128, a user input device 126, and a display module 132. Remote device 120 varies in size, examples include tablet devices, hand-held devices, devices contained in a backpack or brief case, and devices that sit on wheels or reside within a structure. In an embodiment, the remote device 120 enables one person, exclusively, to externally control various subsystems of the aircraft 100.

The aircraft's communication network 114 is a communication media having a bandwidth and sequencing protocol that allows transmission of data between and among the electronic aircraft subsystems, as well as aircraft to ground exchange of data. The aircraft's communication network 114 couples various aircraft subsystems 116 to each other, to the FMS 118 and to the onboard external control module 102. The communication network 114 may route data to and from sensors, devices, instruments, and software that are used for detecting status, temperature, faults, condition, environment, or any other aircraft subsystem 116 data. Therefore, in an embodiment, controlling or commanding an aircraft subsystem 116 implies (i) that there is bidirectional communication, and (ii) that the aircraft communication network 114 has been accessed; such access underscores the value of a secure communication connection when a remote device is utilized.

As a safety check, aircraft subsystems 116 for the engine and for the wheels may be accessed. The onboard external control module 102 may rely on engine sensors 150 to determine whether the aircraft engine is started, and wheel sensors 152 to determine whether the aircraft wheels are bearing weight. The onboard external control module 102 obtains the sensor information and determines that the safety check "passes" when the engine is off and the wheels are on the ground (i.e., the wheels are bearing weight). It is to be noted that aircraft subsystems 116 may operate off of a battery or ground power source rather than the aircraft engine.

Once the safety check has passed, the remote device 120 may be granted access to various aircraft subsystems 116 including, but not limited to, electronic green taxi system (EGTS), aircraft lights, aircraft communication devices (such as radios, ACARS and TCAS devices), hydraulics and servos (such as flaps, control vanes, and moving parts), the auxiliary power unit (APU), and brakes. Some aircraft subsystems 116 may be interdependent, in that it is desirable to command them concurrently. For example, the EGTS and/or the hydraulics and servos may need the APU to be in operation when they are operated. As may be readily understood, the variety of available aircraft subsystems 116 provides opportunities to perform (from the remote device 120) external aircraft ground control operations above and beyond merely moving the aircraft 100.

As mentioned, each aircraft subsystem 116 may have one or more control options. Examples of the control options for various aircraft subsystems 116 include moving the aircraft 100 from a first position/location to a second position/location (i.e., by an EGTS or similar system), moving mechanical parts, toggling lights on and off, running diagnostics, and the like. Control options are communicated to the onboard external control module 102, and to the remote device 120. Accordingly, when properly enabled, a processor (such as on-board processor 112, or the controller 130), may generate commands associated with the available control options for a respective aircraft subsystem 116.

The EGTS (FIG. 2, EGTS 226) is an important aircraft subsystem 116. An electric green taxiing system or engine off taxiing system enables an aircraft to move on the ground without the use of main engines by directly driving the wheels of the aircraft with an electric motor in a manner similar to an electric car. When an electric green taxiing system is installed, the potentially destructive forces produced by the main engines are no longer needed to move the aircraft, and remote ground control possibilities including the moving of an aircraft from one location to another without the need for main engines, tugs, or tow bars are realizable.

As mentioned, display module 132 may be a touchscreen device implemented as a resistive or capacitive touchscreen, a surface acoustic wave (SAW) touchscreen, an infrared touchscreen, or the like. When a touchscreen is used for the display module 132, it may also serve as, at least part of, the user input device 126. Regardless of the display device employed, the display module 132 is adapted to display tabs, controls, and buttons in predetermined locations, with various designs and patterns, and to sense touch input that is associated with those predetermined locations on its surface.

Figure 2:
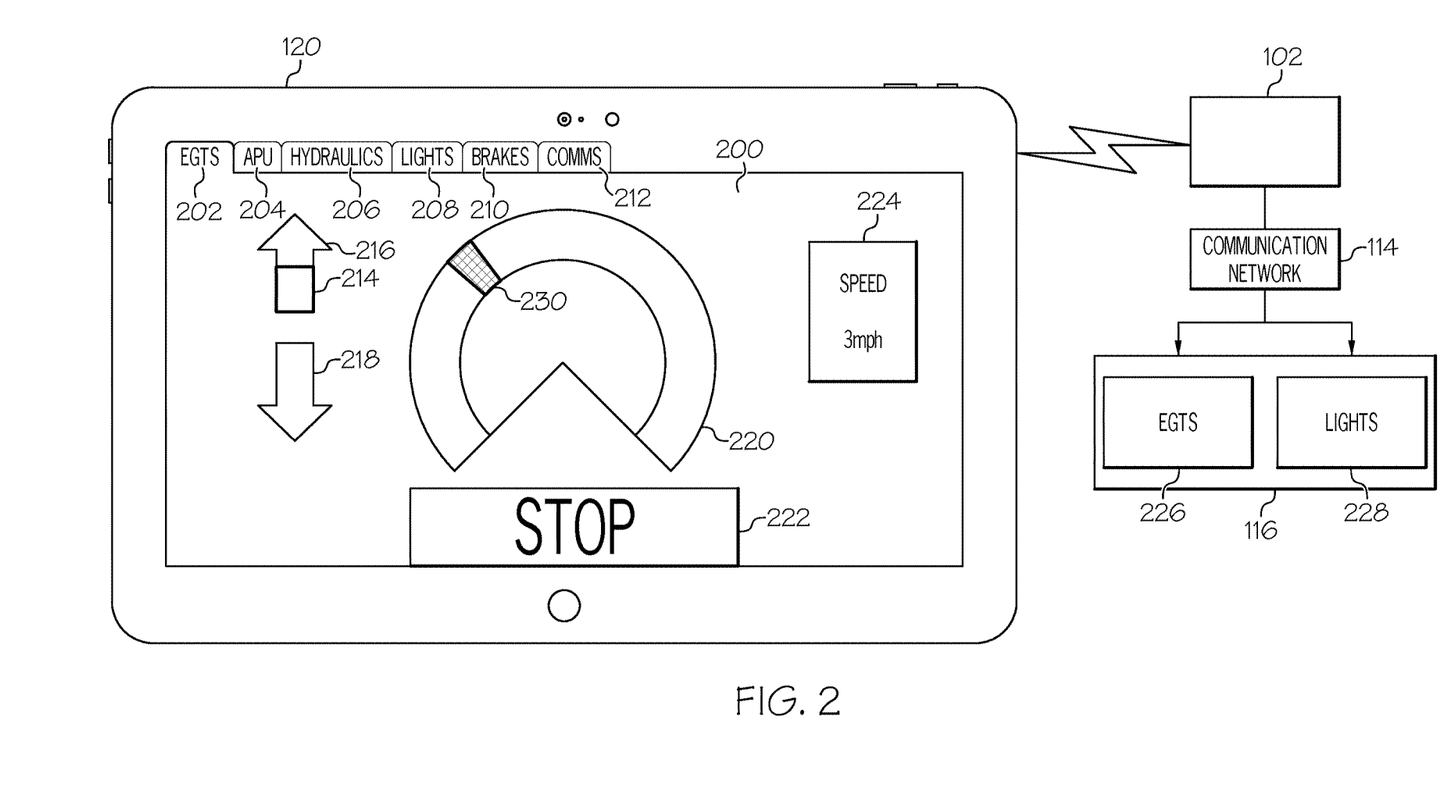
FIG. 2 is an illustration showing a graphical display on a remote device that is configured for external control of an aircraft, according to an exemplary embodiment.

FIG. 2 is an illustration of an exemplary graphical display 200 on a remote device 120 that is configured for external control of an aircraft, according to an embodiment. In the embodiment depicted, the graphical display 200 is a touchscreen device. The graphical display 200 depicts tab options for accessing control of the respective aircraft subsystems 116. The tab options include an EGTS tab 202, APU tab 204, Hydraulics tab 206, Lights tab 208, Brakes tab 210 and Comms tab 212 (Communication Devices). In response to touch input that is associated with a tab, the remote device 120 graphically displays control options associated with the respective aircraft subsystem 116.

EGTS tab 202 is shown shaded to depict that it is selected. The EGTS 226 enables external driving control for the aircraft, such as moving an aircraft from a first location to a second location, and is used for slow speed aircraft ground maneuvers. The exemplary embodiment depicts a graphical display of control options associated with an EGTS. The EGTS control options shown include forward 216, reverse 218, turning 220, and speed 224. Shaded area 214 indicates that forward arrow 216 is selected. Speed 224 displays 3 mph, and shaded area 230 depicts where the turning radius 220 is set. A provided STOP tab 222 allows the user to stop EGTS 226 operations.

The remote device 120 and the onboard external control module 102 are shown coupled via a wireless connection. Onboard external control module 102 is coupled to communication network 114 and the aircraft subsystems 116 for EGTS 226 and Lights 228.

Figure 3:
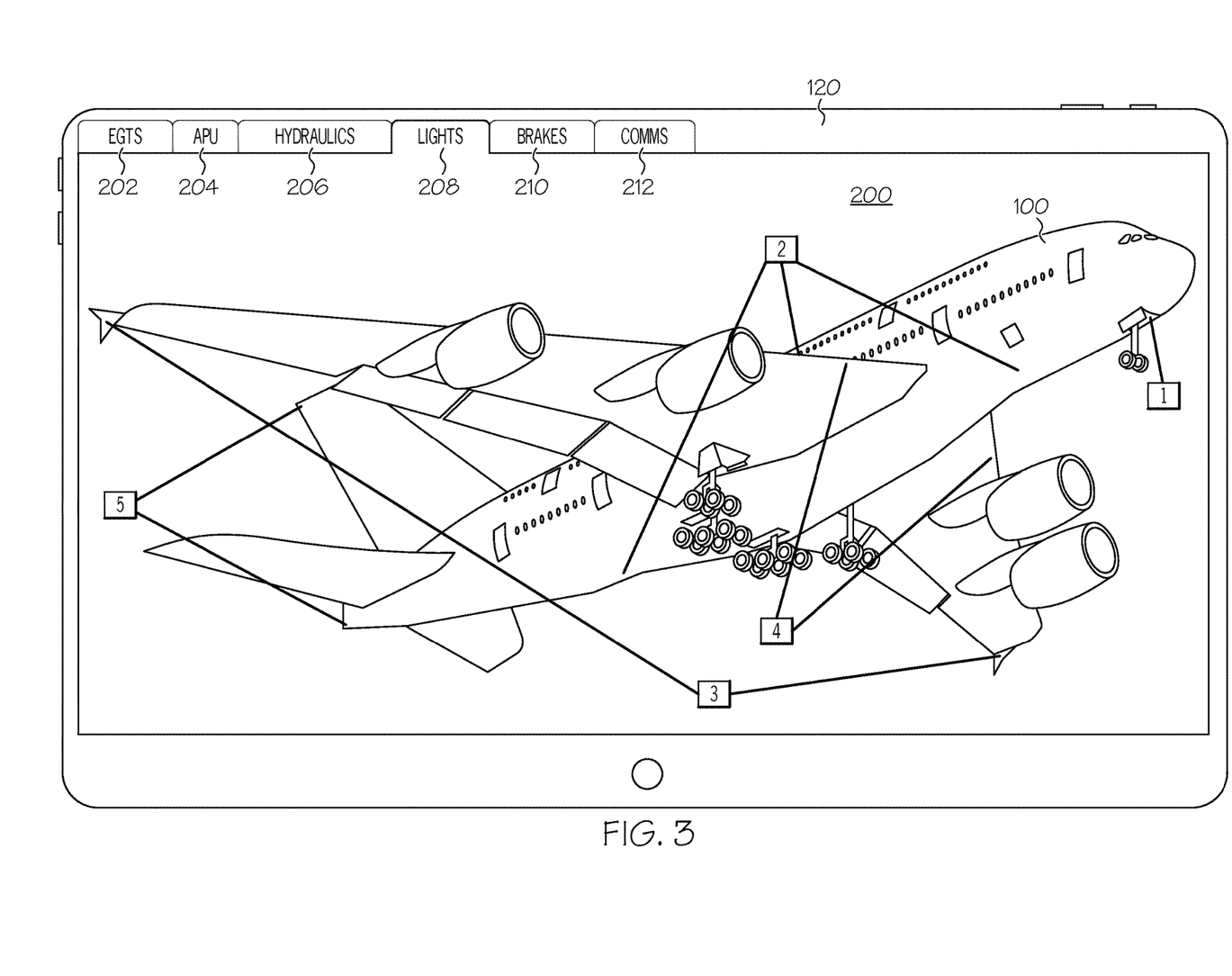
FIG. 3 depicts the remote device of FIG. 2, with the Lights tab selected for external control of lights on aircraft, according to the embodiment.

It is contemplated that a user may want to access and control multiple aircraft subsystems 116 in one session, such as lights, or the APU, for example, in the course of commanding EGTS 226. In the following figure, an exemplary graphical display of control options associated with a lights 228 subsystem is depicted.

FIG. 3 depicts the remote device 120 of FIG. 2, with the Lights tab 208 selected for external control of the lights 228 subsystem on aircraft 100, according to the embodiment. The exemplary embodiment depicts optional controls for lights at a front wheel (1), lights distributed around the body of the aircraft (2), lights at the tips of the wings (3), under-wing lights (4), and tail lights (5). In an embodiment, a user may touch the screen to toggle the respective lights on or off.

Figure 4:
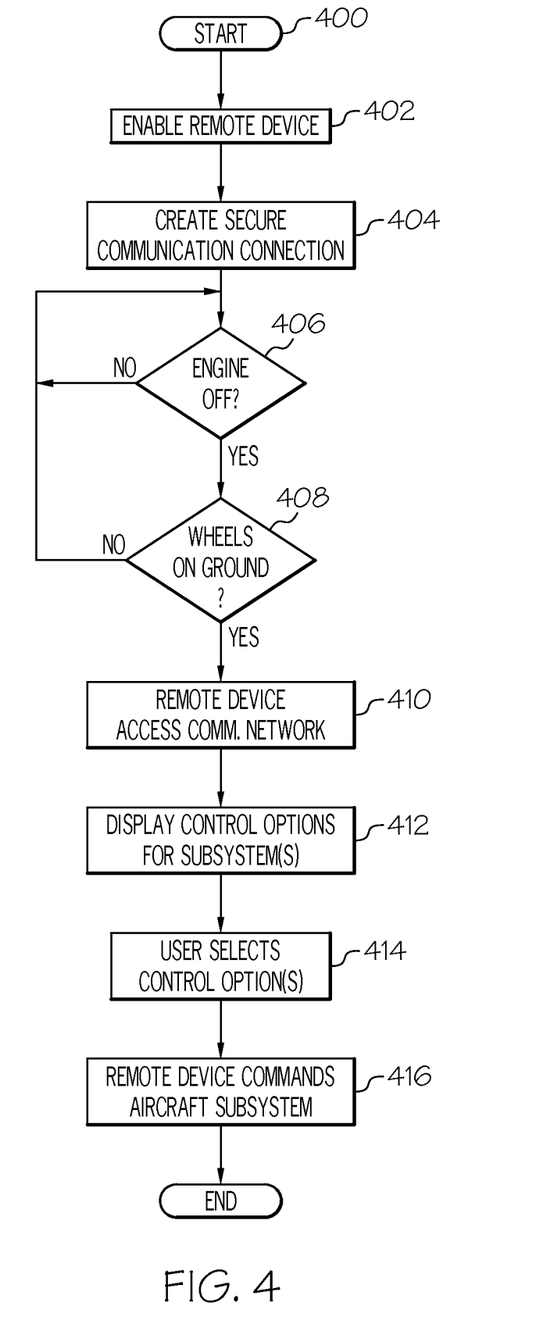
FIG. 4 is a flow chart of a process for external control of an aircraft, according to the exemplary embodiment.

FIG. 4 is a flow chart of a process 400 for external ground control of an aircraft 100 via a remote device, according to the exemplary embodiment. While the steps of process 400 are depicted as occurring in a certain order, steps may be rearranged, added or deleted without departing from the scope of the invention.

At STEP 402 onboard external control module 102 enables remote device 120 to have access to, and control of, various aircraft subsystems 116. As previously mentioned, controlling or commanding an aircraft subsystem 116 may imply that the aircraft communication network 114 has been accessed.

Although the technique and/or protocol of creating a secure communication connection is not the subject of the current invention, the secure communication connection between onboard external control module 102 and remote device 120 is established at STEP 404. As previously mentioned, the secure communication connection may employ a ground line 122 or a wireless connection.

At STEP 406 process 400 receives aircraft engine sensor information and determines whether the engine is off, and at STEP 408 process 400 receives aircraft wheel sensor information and determines whether the wheels are on the ground. STEP 406 and STEP 408 are safety checks. If the engine is off and the wheels are on the ground (i.e., the safety check passes), process 400 permits remote device 120 to externally control various aircraft subsystems 116 (STEP 410). It is contemplated that process 400 may reach STEP 410 in response to just one safety check, for example, by determining just one of (1) that the engine is off (STEP 406), or (2) that the wheels are on the ground (STEP 408).

At STEP 412, control options for various aircraft subsystems 116 are graphically displayed on a display module 132 of remote device 120. A user selects one or more control options using the user input device 126 at STEP 414. The user selection may occur via touch contact with a touch-screen display, or via manipulation of any type of user input device 126.

At STEP 416, the remote device commands the aircraft subsystem 116. In an embodiment, remote control of the aircraft subsystem involves the controller 130 and the onboard processor 112 as follows. Controller 130 processes the user selection and transmits it to the onboard external control module 102. On-board processor 112, in the onboard external control module 102, converts the user selection into a command and forwards the command, via the aircraft communication network 114, to a respective aircraft subsystem 116. In other embodiments, the conversion of the user selection into a command may occur in the remote device 120.

Process 400 supports the continuous external command of the aircraft 100 over a secure communication network while the remote device is enabled (STEP 402) and while the engine is off and/or the wheels are on the ground. Non-limiting examples of commands and controls for aircraft subsystems 116 that are supported by process 400 include movement of the aircraft 100 from a first position/location to a second position/location (for example, by an EGTS), movement of various mechanical parts (such as flaps), toggling lights on and off, and running diagnostic tests.

Thus, the method and system provided advantageously reduces personnel count during ground operations, and employs wireless communication. The provided method and system are capable of enabling a remote device to have external ground control of a manned aircraft without a pilot, in order to (i) move the aircraft, and (ii) command various subsystems of the aircraft.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for external ground control, using a remote device, of a manned aircraft without a pilot, the aircraft having a plurality of aircraft subsystems, the method comprising:
    enabling the remote device to access the plurality of aircraft subsystems;
    creating a secure communication connection between the remote device and the plurality of aircraft subsystems when the remote device is enabled;
    receiving aircraft engine sensor information;
    determining, from the aircraft engine sensor information, when the aircraft engine is off;
    permitting the remote device to externally control the plurality of aircraft subsystems, responsive to determining that the aircraft engine is off; and
    commanding an aircraft subsystem of the plurality of aircraft subsystems, from the remote device, only when the aircraft engine is off.

2. The method of claim 1, further comprising:
    receiving aircraft wheel sensor information;
    determining, from the aircraft wheel sensor information, whether aircraft wheels are on the ground; and
    wherein the step of commanding an aircraft subsystem of the plurality of aircraft subsystems, comprises commanding the aircraft subsystem only on the further condition that the aircraft wheels are on the ground.

3. The method of claim 1, wherein the remote device comprises a remote transceiver, a display module and a user input device, wherein the method further comprises:
    receiving, by the remote transceiver, control options associated with the aircraft subsystem of the plurality of aircraft subsystems;

graphically displaying, on the display module, the control options;
receiving, by the user input device, a user selected control option; and
commanding the aircraft subsystem in accordance with the user selected control option.

4. The method of claim 1, wherein the aircraft subsystem of the plurality of aircraft subsystems is an electronic green taxi system (EGTS), and commanding the aircraft subsystem further comprises moving the aircraft from a first location to a second location only with the EGTS.

5. The method of claim 1, wherein the step of creating a secure communication connection comprises connecting via a bidirectional land line.

6. The method of claim 1, wherein the step of creating a secure communication connection comprises connecting via a bidirectional wireless communication.

7. The method of claim 1, wherein the aircraft subsystem is one of: an electronic ground taxi system (EGTS), lights, communication systems, hydraulics and servos, auxiliary power unit, and brakes.

8. The method of claim 1, further comprising:
receiving a plurality of control options comprising control options for at least two aircraft subsystems in the set of (i) an electronic ground taxi system (EGTS), (ii) lights, (iii) communication systems, (iv) hydraulics and servos, (v) auxiliary power unit, and (vi) brakes;
graphically displaying the plurality of control options on the remote device;
receiving a number of user selected control options, wherein each of the number of user selected control options corresponds to a control option associated with a respective one of the at least two aircraft subsystems in the set; and
commanding each of the at least two aircraft subsystems in accordance with the associated user selected control options.

9. A system for external ground control, using a remote device, of a manned aircraft without a pilot, the aircraft having a plurality of aircraft subsystems, the system comprising:
an on-board transceiver configured to support a secure communication connection between the plurality of aircraft subsystems and the remote device;
an on-board processor coupled to the transceiver and an aircraft subsystem and configured to i) enable the remote device to access the plurality of aircraft subsystems, ii) create the secure communication connection when access to the remote device is enabled, iii) perform a safety check of the aircraft, v) permit the remote device to externally control the plurality of aircraft subsystems, responsive to determining that the safety check passes, and vi) allow the remote device to command an aircraft subsystem of the plurality of aircraft subsystems, only when the remote device is enabled and the safety check passes.

10. The system of claim 9, further comprising an aircraft engine sensor, and wherein the on-board processor is further configured to:
receive aircraft engine sensor information;
determine, from the aircraft engine sensor information, when the aircraft engine is off; and
determine that the safety check passes when the aircraft engine is off.

11. The system of claim 10, further comprising an aircraft wheel sensor, and wherein the on-board processor is further configured to:
receive aircraft wheel sensor information;
determine, from the aircraft wheel sensor information, whether aircraft wheels are on the ground; and
determine that the safety check passes when the aircraft wheels are on the ground.

12. The system of claim 9, wherein the remote device comprises:
a remote transceiver;
a display module; and
a user input device; and
a controller coupled to the remote transceiver, display module, and the user input device, and configured to (i) receive control options associated with at least two of the aircraft subsystems (ii) command the display module to graphically display the control options, (iii) receive a user selected control option, and (iv) command the respective aircraft subsystem of the at least two aircraft subsystems in accordance with the user selected control option.

13. The system of claim 12, wherein an aircraft subsystem of the at least two aircraft subsystems is an electronic ground taxi system (EGTS), the user selected control option is associated with the EGTS, and the remote device is configured to command the aircraft to move, via the EGTS, from a first position to a second position, in accordance with the user selected control option.

14. The system of claim 9, wherein the secure communication connection comprises one of (i) a bidirectional land line and (ii) a bidirectional wireless communication.

15. The system of claim 9, wherein the at least two aircraft subsystems are from the set: the electronic ground taxi system (EGTS), lights, communication systems, hydraulics and servos, auxiliary power unit, and brakes.

16. A method for external ground control of an aircraft having a plurality of aircraft subsystems, using a remote device, the method comprising:
enabling the remote device to have access to the plurality of aircraft subsystems;
creating a secure communication connection between the remote device and the plurality of aircraft subsystems when the remote device is enabled;
performing a safety check of the aircraft;
permitting the remote device to externally control the plurality of aircraft subsystems, responsive to determining that the safety check passes;
receiving, by the remote device, control options associated with an aircraft subsystem of the plurality of aircraft subsystems;
graphically displaying, on the remote device, the control options;
receiving, by the remote device, a user selected control option;
converting the user selected control option into a command;
forwarding the command, via an aircraft communication network, to the aircraft subsystem of the plurality of subsystems; and
commanding the aircraft subsystem in accordance with the user selected control option, only when the safety check passes.

17. The method of claim 16, further comprising:
receiving aircraft engine sensor information;
determining, from the aircraft engine sensor information, when the aircraft engine is off;
receiving aircraft wheel sensor information;
determining, from the aircraft wheel sensor information, whether aircraft wheels are on the ground; and wherein performing a safety check comprises determining that (i) the aircraft engine is off and (ii) the aircraft wheels are on the ground.

18. The method of claim 16, wherein commanding the aircraft subsystem comprises moving the aircraft from a first location to a second location.

19. The method of claim 16, wherein commanding an aircraft subsystem comprises commanding at least one of: an electronic ground taxi system (EGTS), lights, communication systems, hydraulics and servos, auxiliary power unit, and brakes.

\* \* \* \* \*